US006337988B1

(12) United States Patent
Agin et al.

(10) Patent No.: US 6,337,988 B1
(45) Date of Patent: **\*Jan. 8, 2002**

(54) METHOD FOR IMPROVING PERFORMANCES OF A MOBILE RADIOCOMMUNICATION SYSTEM USING A POWER CONTROL ALGORITHM

(75) Inventors: Pascal Agin, Sucy en Brie; Sebastien Boch, Paris, both of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/337,677

(22) Filed: Jun. 22, 1999

(30) Foreign Application Priority Data

Apr. 12, 1999 (EP) .............................. 99400894
May 19, 1999 (EP) .............................. 99401207

(51) Int. Cl.[7] .......................... H04Q 7/20; H04B 17/00; H04B 7/00; H04B 7/185; H04B 7/216
(52) U.S. Cl. .......................... 455/522; 455/69; 455/70; 455/67.1; 370/318; 370/320; 370/335
(58) Field of Search ........................ 455/69, 70, 127, 455/343, 13.4, 296, 298, 226.3, 226.2, 226.1, 9.1, 504, 67.1, 67.6, 68, 422; 375/224–227, 252, 296, 297, 219, 148; 370/317, 318, 332, 333, 335, 342, 320, 252

(56) References Cited

U.S. PATENT DOCUMENTS

| 5,513,183 A | * | 4/1996 | Kay et al. ..................... 455/422 |
| 5,751,763 A | * | 5/1998 | Burckert ..................... 455/522 |
| 5,835,527 A | | 11/1998 | Lomp |
| 5,852,782 A | * | 12/1998 | Komatsu ..................... 455/422 |
| 6,192,249 B1 | * | 2/2001 | Padovani ............... 455/67.1 X |

FOREIGN PATENT DOCUMENTS

| EP | 0 388 8995 A2 | 9/1990 |
| WO | WO 98/02981 | 1/1998 |
| WO | WO 98/36508 | 8/1998 |

* cited by examiner

Primary Examiner—Tracy Legree
(74) Attorney, Agent, or Firm—Sughrue Mion, PLLC

(57) ABSTRACT

A method for improving performances of a mobile radiocommunication system using a power control algorithm, wherein the system may be subject to transmission interruptions. The method uses the steps of: determining a preferred form in which the power control algorithm should better be implemented, when transmission is resumed after a transmission interruption, to better compensate for the effects of the transmission interruption on power control; and implementing the power control algorithm in the thus determined form.

42 Claims, 5 Drawing Sheets

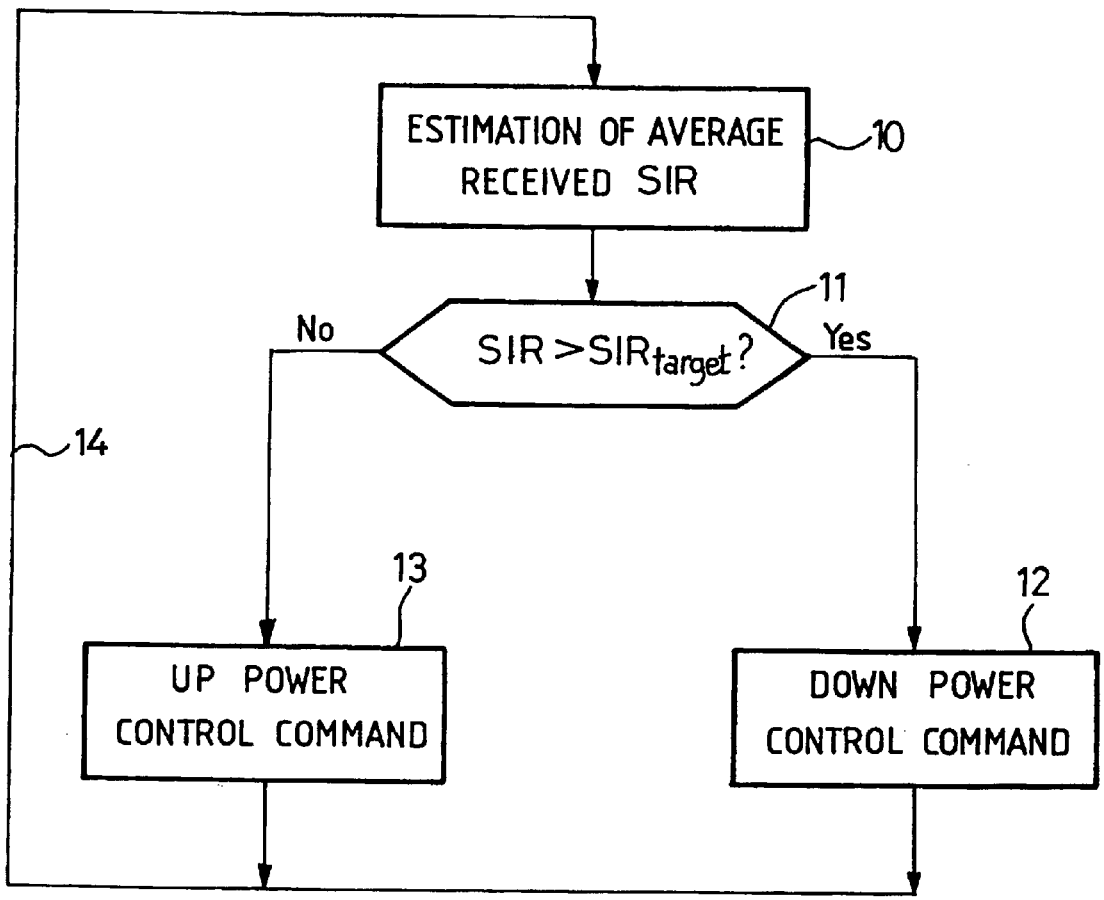
FIG_1
PRIOR ART

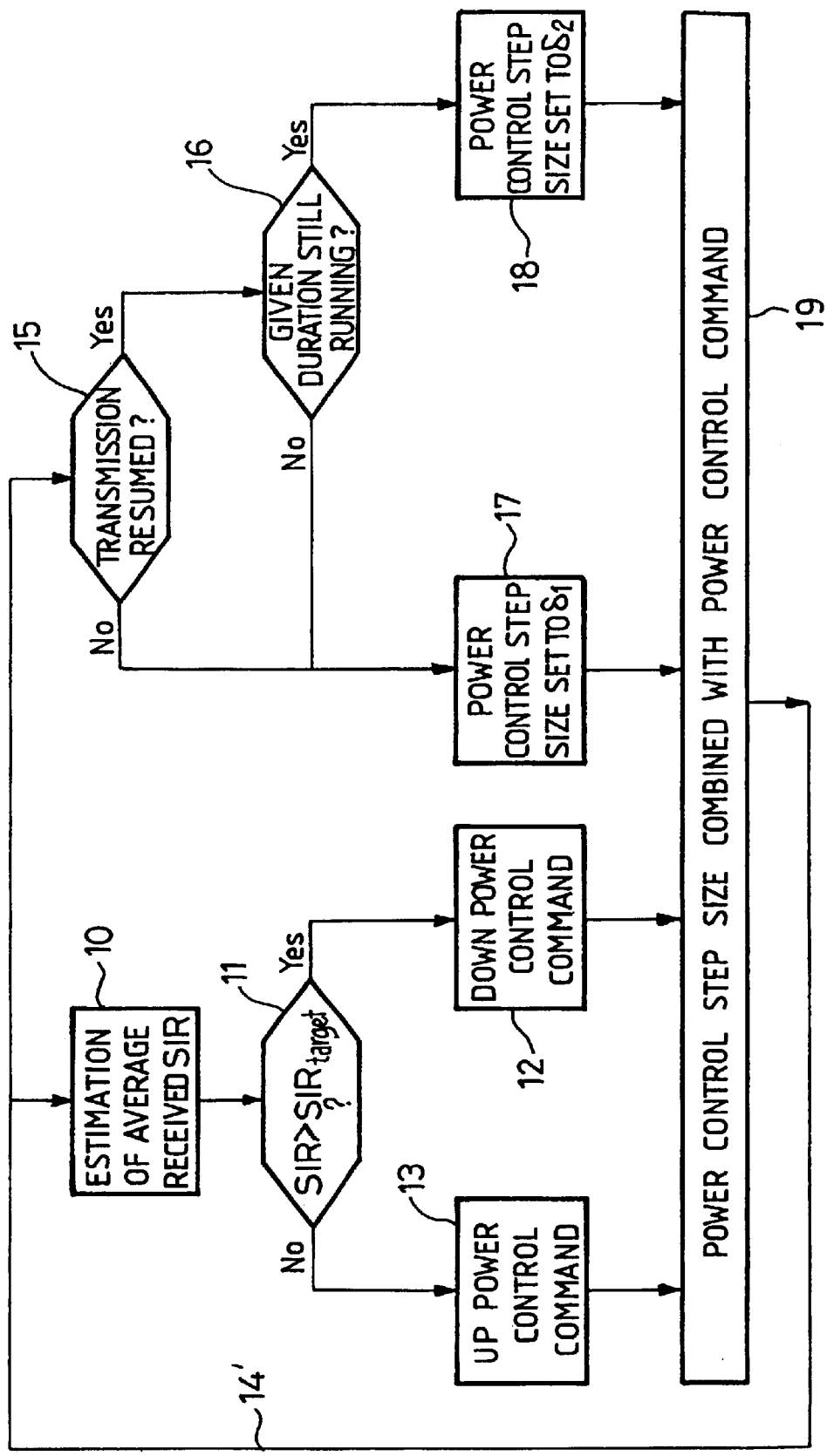
FIG_2   PRIOR ART

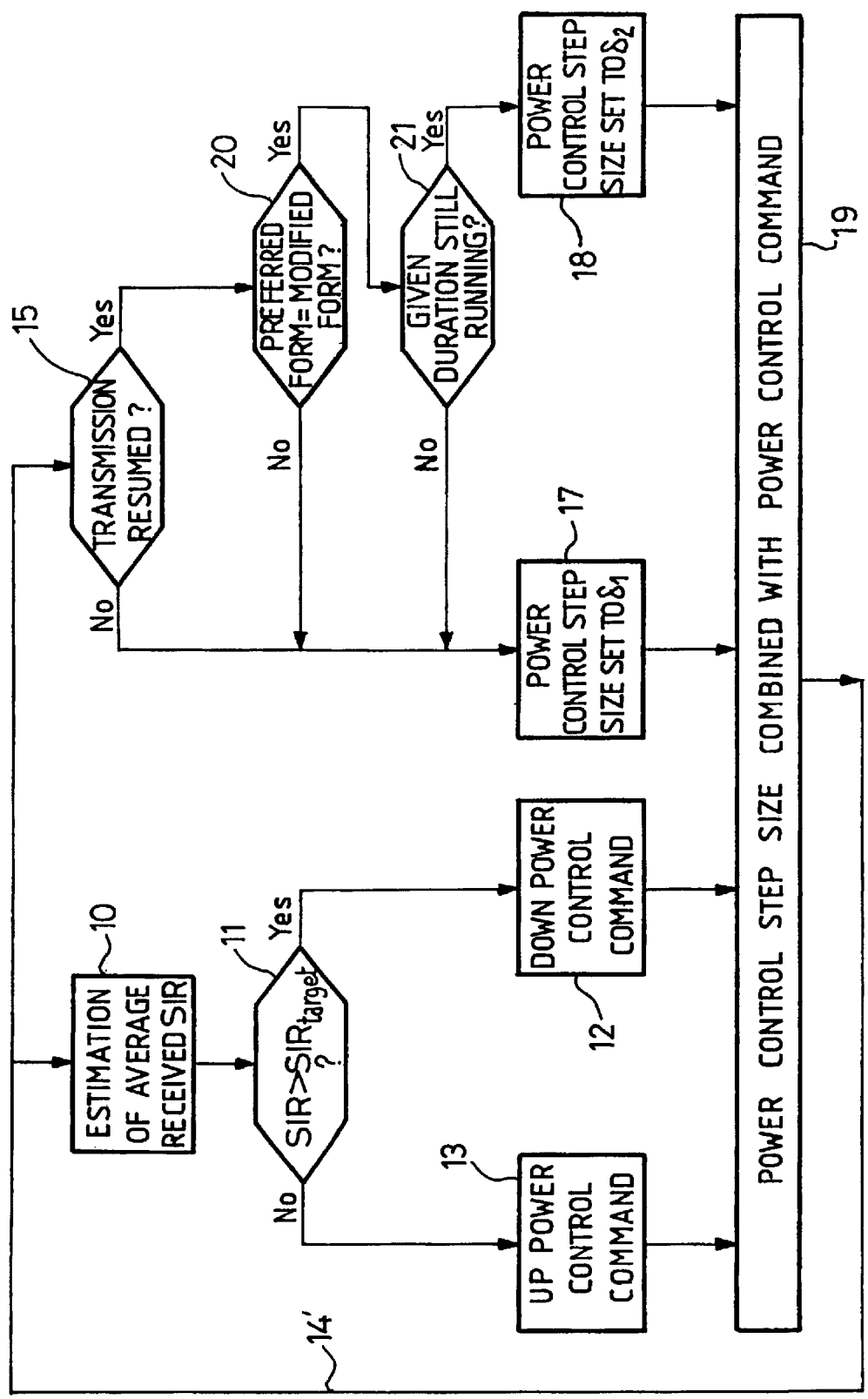

FIG_4
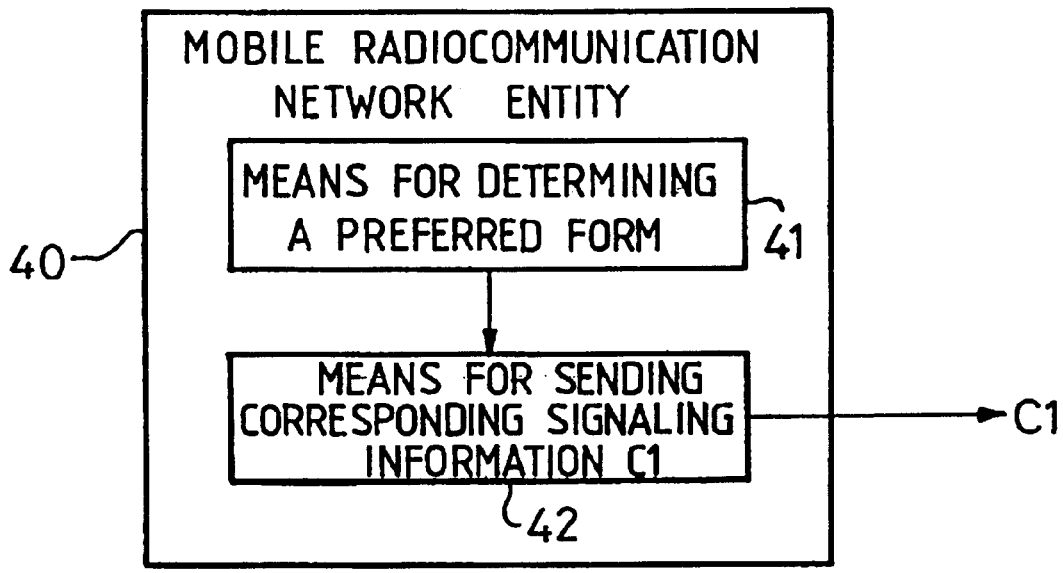
FIG_5
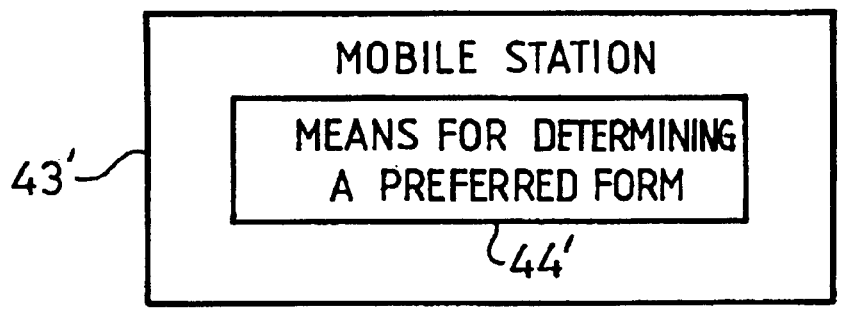

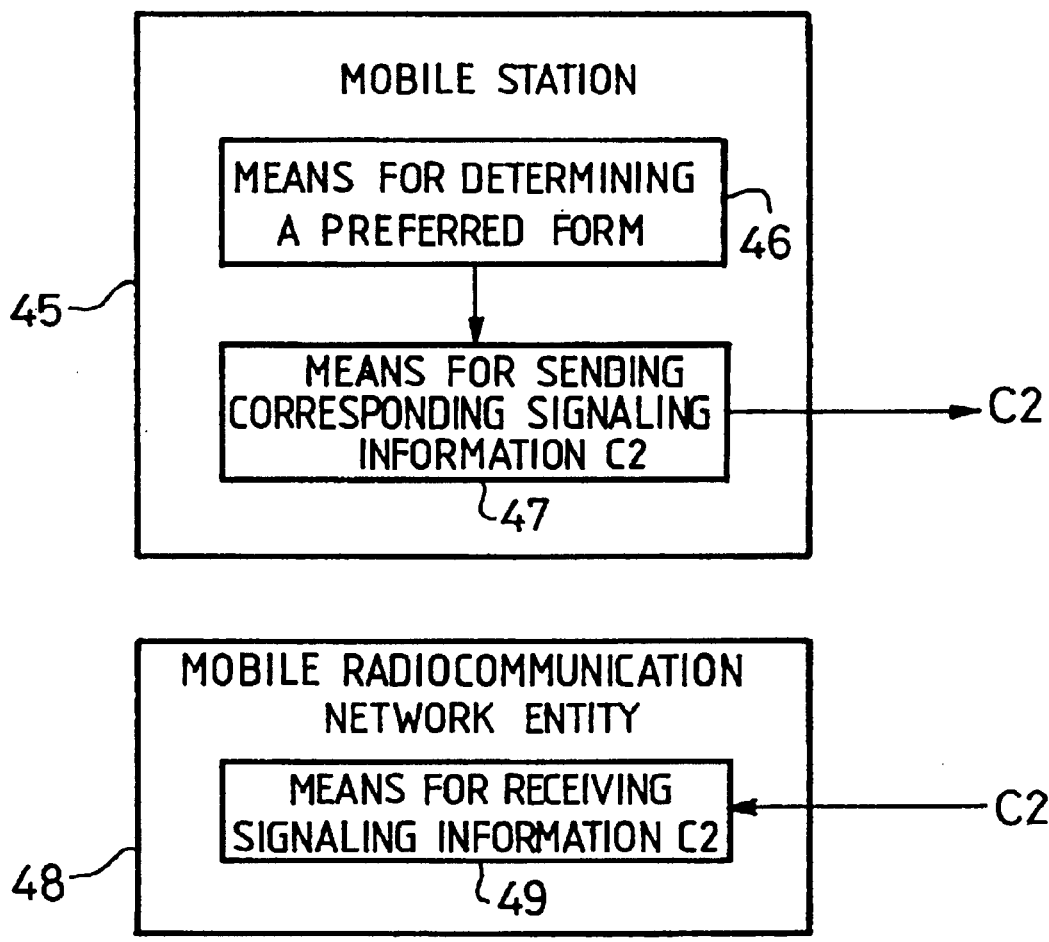
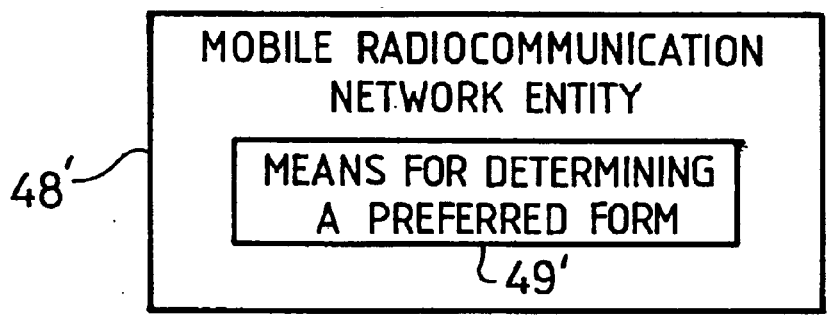

METHOD FOR IMPROVING PERFORMANCES OF A MOBILE RADIOCOMMUNICATION SYSTEM USING A POWER CONTROL ALGORITHM

BACKGROUND OF THE INVENTION

The present invention is generally concerned with mobile radiocommunication systems.

The present invention is more particularly concerned with power control techniques used in such systems to improve performances (in terms of quality of service, of capacity, ... etc.).

The present invention is in particular applicable to mobile radiocommunication systems of CDMA ("Code Division Multiple Access") type. In particular, the present invention is applicable to UMTS ("Universal Mobile Telecommunication System").

As is known, CDMA systems use two types of power control techniques, a so-called open-loop power control technique, and a so-called closed loop power control technique (also called hereinafter CLPC). These power control techniques may be recalled for example for the uplink transmission direction, i.e. from MS ("Mobile Station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as constant as possible.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a power control command to the MS, for the MS to increase its transmit power. Otherwise, the BTS sends a power control command to the MS, for the MS to decrease its transmit power. The target SIR is chosen by the BTS as a function of the required quality of service.

To be efficient and track the variations of the SIR as closely as possible, in particular in fast changing environments, the CLPC needs to be rapid; as an example, in third generation systems like for example UMTS, power control commands are typically sent to a MS every slot in a frame (a slot being an elementary time unit in a packet data unit, or frame, transmitted in such a system, the frame duration being typically equal to 10 ms, and the slot duration to 1/16 of the frame duration).

Now there are some situations in mobile radiocommunication systems, in which transmission of power control commands has to be momentarily interrupted. This will also hereinafter be referred to as transmission interruptions.

As an example, in CDMA systems, downlink transmission from a BTS to a MS may momentarily be interrupted to allow this MS to make measurements on frequencies other than the one used for this downlink transmission (in particular for handover preparation purposes, in particular inter-frequency handovers). Such a transmission mode including transmission interruptions is also referred to as "slotted mode" or "compressed mode" in third generation systems like UMTS for example. A transmission interruption may last several slots. During these transmission interruptions, the CLPC is interrupted. Thus, the BTS does not send any more power control commands to the MS, and the uplink signals from this MS are no longer power controlled. Uplink transmission may simultaneously be interrupted, but in either case, as a result, the efficiency of the CLPC is significantly decreased, and the performances of the system may be seriously degraded.

In European patent application No. 99400894.4 filed on Apr. 12, 1999 (corresponding to U.S. application Ser. No. 09/302,985, filed Apr. 30, 1999) by Applicant, a solution has been proposed to avoid such degradations of performances, due to such transmission interruptions.

Essentially, according to this prior patent application, when transmission is resumed after a transmission interruption, said power control algorithm is implemented with at least one modified parameter, for a given duration, said at least one modified parameter and said given duration being determined so as to compensate for the effects of said transmission interruption on power control.

Said at least one modified parameter may in particular be an increased power control step size. In practice, to reduce the amount of signalling required to implement such a method, such an increased power control step size $\delta_2$ may be fixedly set to a multiple (for example two times) of a power control step size $\delta_1$ used otherwise.

Problems may arise, if the power control step size $\delta_1$ is itself variable (for instance as a function of environment conditions or mobile speed for example). It may happen that the power control step size $\delta_1$ currently in use when transmission is resumed is already large enough to achieve the result aimed at with such a method, and that an additional increase of the power control step size would on the contrary degrade the performances (for example, if $\delta_1$ may take one of the two values 1 dB and 2 dB, and if $\delta_2$=2. $\delta_1$, $\delta_1$=2 dB leads to $\delta_2$=4 dB which may be too large).

The present invention enables to avoid such problems.

More generally, the present invention enables to better compensate for the effects of such transmission interruptions on power control, thereby improving performances.

Besides, the present invention enables such an improvement, while not increasing too much the amount of signalling required.

SUMMARY OF THE INVENTION

An object of the present invention is therefore a method for improving performances of a mobile radiocommunication system using a power control algorithm, wherein said system may be subject to transmission interruptions, said method comprising the steps of:

determining a preferred form in which said power control algorithm should better be implemented when transmission is resumed after a transmission interruption, to better compensate for the effects of said transmission interruption on power control, implementing said power control algorithm in the thus determined form.

According to another object of the invention, said preferred form is determined as the preferred one among:

at least one modified form, wherein at least one parameter of said power control algorithm is modified, for a given duration, when transmission is resumed, a non-modified form, wherein no parameter of said power control algorithm is modified when transmission is resumed.

According to another object of this invention, said modified and non-modified forms include different forms in which said algorithm may be implemented to adapt it to various conditions which may require such an adaptation.

According to another object of this invention, said conditions include environment conditions and/or mobile speed.

According to another object of this invention, said at least one parameter is the power control step size of said power control algorithm.

According to another object of this invention, said at least one modified parameter is an increased power control step size.

According to another object of the invention, said mobile radiocommunication system is of CDMA type.

According to another object of the invention, said power control is performed in the uplink transmission direction of said mobile radiocommunication system.

According to another object of the invention, said power control is performed in the downlink transmission direction of said mobile radiocommunication system.

According to another object of this invention, said power control algorithm involving a transmitting entity (mobile station or mobile radiocommunication network entity depending on whether said power control is performed in uplink or in downlink) and a receiving entity (mobile station or mobile radiocommunication network entity depending on whether said power control is performed in downlink or in uplink), said preferred form is determined in one of said entities, and sent, by means of signalling informations, to the other one of said entities, to be used by said other one of said entities.

According to another object of this invention, said signalling informations are transmitted together with transmission interruption commands.

According to another object of this invention, said signalling informations include a bit indicating which of a non-modified and a modified form is preferred.

According to another object of this invention, said signalling informations include additional bits indicating which of a plurality of modified forms is preferred.

According to another object of this invention, said preferred form is determined by one of said entities, and used locally by this entity, without any signalling to the other entity.

Another object of the present invention is a mobile radiocommunication network entity (such as in particular BTS) for performing such a method.

Another object of the present invention is a mobile station (MS) for performing such a method.

According to another object of the invention, a mobile radiocommunication network entity comprises, for performing said method in said uplink transmission direction:
    means for determining a preferred form in which said power control algorithm should better be implemented when transmission is resumed after a transmission interruption, to better compensate for the effects of said transmission interruption on power control,
    means for sending corresponding signalling informations to a mobile station.

According to another object of the invention, a mobile station comprises, for performing said method in said uplink transmission direction:
    means for receiving such signalling informations from a mobile radiocommunication network entity.

According to another object of the invention, a mobile station comprises, for performing said method in said uplink transmission direction:
    means for determining a preferred form in which said power control algorithm should better be implemented when transmission is resumed after a transmission interruption, to better compensate for the effects of said transmission interruption on power control.

According to another object of the invention, a mobile station comprises, for performing said method in said downlink transmission direction:
    means for determining a preferred form in which said power control algorithm should better be implemented when transmission is resumed after a transmission interruption, to better compensate for the effects of said transmission interruption on power control,
    means for sending corresponding signalling informations to a mobile radiocommunication network entity.

According to another object of the invention, a mobile radiocommunication network entity comprises, for performing said method in said downlink transmission direction:
    means for receiving such signalling informations from a mobile station.

According to another object of the invention, a mobile radiocommunication network entity comprises, for performing said method in said downlink transmission direction:
    means for determining a preferred form in which said power control algorithm should better be implemented when transmission is resumed after a transmission interruption, to better compensate for the effects of said transmission interruption on power control.

BRIEF DESCRIPTION OF THE DRAWINGS

These and other objects of the present invention will become more apparent from the following description taken in conjunction with the accompanying drawings:

FIG. 1 is a diagram intended to illustrate a current CLPC algorithm,

FIG. 2 is a diagram intended to illustrate a CLPC algorithm, modified so as to include a method according to the above-mentioned prior patent application, FIG. 3 is a diagram intended to illustrate a CLPC algorithm, modified so as to include a method according to the present invention, FIG. 4 is a diagram intended to illustrate the type of means which may be required in a mobile radiocommunication network entity and in a mobile station to perform a method according to the present invention, in the uplink transmission direction of a mobile radiocommunication system, according to a first embodiment, FIG. 5 is a diagram intended to illustrate the type of means which may be required in a mobile station to perform a method according to the present invention, in the uplink transmission direction of a mobile radiocommunication system, according to a second embodiment, FIG. 6 is a diagram intended to illustrate the type of means which may be required in a mobile radiocommunication network entity and in a mobile station to perform a method according to the present invention, in the downlink transmission direction of a mobile radiocommunication system, according to a first embodiment, FIG. 7 is a diagram intended to illustrate the type of means which may be required in a mobile radiocommunication network entity to perform a method according to the present invention, in the downlink transmission direction of a mobile radiocommunication system, according to a second embodiment.

DETAILED DESCRIPTION OF THE INVENTION

As an example, description of FIGS. 1, 2 and 3 will be made for uplink power control, but it should be understood that the present invention also applies to downlink, or both uplink and downlink, power control.

As recalled in FIG. 1, a current CLPC algorithm comprises the following steps, for each time $t_i$:

- At step 10, the BTS estimates the averaged received SIR during a period T,
- At step 11, the BTS compares this SIR to a target SIR, $SIR_{target}$,
- If $SIR > SIR_{target}$, at step 12 the BTS sends a "down" power control command to the MS, for the MS to decrease its power by $\delta$ dB, where $\delta$ is the power control step size of the algorithm,
- If $SIR < SIR_{target}$, at step 13 the BTS sends an "up" power control command to the MS, for the MS to increase its power by $\delta$ dB.

This is periodically repeated, with a repetition period T, as illustrated by loop 14.

An example of modification of this CLPC algorithm so as to include a method according to the above-mentioned prior patent application is recalled in FIG. 2.

The steps which can be common to FIGS. 1 and 2 are noted with the same references.

In the example of FIG. 2:

- At step 10, the BTS estimates the averaged received SIR during a period T,
- At step 11, the BTS compares this SIR to a target SIR, $SIR_{target}$,
- If $SIR > SIR_{target}$, at step 12 the BTS provides a "down" power control command for the MS, for the MS to decrease its power by $\delta$ dB,
- If $SIR < SIR_{target}$, at step 13 the BTS provides an "up" power control command for the MS, for the MS to increase its power by $\delta$ dB,
- Besides, it is checked at step 15 if transmission is resumed after a transmission interruption period Tint, and in case transmission is resumed, it is checked at step 16 if a given duration T' following this interruption period Tint is still running,
- If transmission is not resumed after a transmission interruption, or if it is resumed and if the duration T' is passed, at step 17 the power control step size for the MS is set to $\delta = \delta_1$, where $\delta_1$ corresponds to a non-modified power control step size,
- If transmission is resumed after a transmission interruption, and if the duration T' is still running, at step 18 the power control step for the MS is set to $\delta = \delta_2$, where $\delta_2$ corresponds to a modified power control step size, in particular an increased power control step size,
- at step 19 the thus determined power control step size $\delta_1$, or $\delta_2$ is combined with the "up" or "down" power control command provided at step 12 or 13, to obtain a resulting power control command for the MS.

This is periodically repeated, with a period T, as indicated by loop 14'.

As indicated in this prior patent application:

Part or all of steps 15 to 19 may be performed in the BTS, or in the MS, or part in the BTS and part in the MS. It may be advantageous that these steps be performed in the MS, to avoid an increase in the size of the corresponding power control messages to be sent to MSs.

Parameters T' and $\delta_2$ may be determined according to various possibilities.

In a simplest way, parameters T' and $\delta_2$ may have predetermined values; for example the values T'=Tint and $\delta_2 = 2\delta_1$ have been found to be interesting in practice.

In a more elaborated way, it may for example be determined that duration T' is passed when a certain condition is fulfilled, such as for instance when two consecutive power control commands obtained with power control step $\delta_2$ are opposed (i.e. one is an "up" power control command and the other one a "down" power control command).

Parameters T' and $\delta_2$ may also for example be determined based on statistics on power control results for a transmission period before said transmission interruption; for example the largest the variations of a received signal power before the interruption, the largest $\delta_2$ and T', and vice-versa.

Other examples of determination of parameters T' and $\delta_2$ might be possible; it will be understood that it is not possible to give a complete list of such possibilities; the main point is that said at least one modified parameter ($\delta_2$ in this example) and said given duration (T' in this example) be determined so as to compensate for the effects of said transmission interruption on power control.

Besides this could as well be obtained by taking another parameter of the algorithm than its power control step size, though this latter will probably be the most interesting one in practice.

Besides, the method according to this prior patent application applies to any cases of transmission interruptions, whatever the reason of these interruptions ("slotted mode" or "compressed mode", "DTX" mode or "discontinuous transmission mode", ... etc).

An example of modification of this CLPC algorithm so as to include a method according to the present invention is disclosed in FIG. 3. It should however be noted that this example is not limitative and that the invention might as well be applied to other examples of algorithms.

The steps which can be common to FIGS. 1, 2 and 3 are noted with the same references.

According to the present invention, there are provided the steps of:

determining a preferred form in which said power control algorithm should better be implemented when transmission is resumed after a transmission interruption, to better compensate for the effects of said transmission interruption on power control, implementing said power control algorithm in the thus determined form.

In particular, said preferred form may be determined as the preferred one among:

at least one modified form, wherein at least one parameter of said power control algorithm is modified, for a given duration, when transmission is resumed, a non-modified form, wherein no parameter of said power control algorithm is modified when transmission is resumed.

Besides, said modified and non-modified forms may include different forms in which said algorithm may be implemented to adapt it to various conditions which may require such an adaptation. Such conditions may for example include environment conditions and/or mobile speed.

In the example of FIG. 3:

- At step 10, the BTS estimates the averaged received SIR during a period T,
- At step 11, the BTS compares this SIR to a target SIR, $SIR_{target}$,
- If $SIR > SIR_{target}$, at step 12 the BTS provides a "down" power control command for the MS, for the MS to decrease its power by $\delta$ dB, ➢ If SIR<SIR$_{target}$, at step 13 the BTS provides an "up" power control command for the MS, for the MS to increase its power by δ dB, ➢ Besides, it is checked at step 15 if transmission is resumed after a transmission interruption period Tint, ➢ If transmission is not resumed after a transmission interruption, at step 17 the power control step size for the MS is set to δ=δ$_1$, where δ$_1$ corresponds to a non-modified (or current) power control step size, ➢ If transmission is resumed after a transmission interruption, at step 20 there is determined a preferred form in which said power control algorithm should better be implemented, to better compensate for the effects of said transmission interruption on power control, ➢ If the preferred form determined at step 20 is a modified form, it is checked at step 21 if said given duration T', is still running, ➢ If it is determined at step 21 that the duration T' is still running, at step 18 the power control step size for the MS is set to δ=δ$_2$, where δ$_2$ corresponds to a modified power control step size, ➢ If it is determined at step 21 that the duration T' is passed, at step 17 the power control step for the MS is set to δ=δ$_1$, where δ$_1$ corresponds to a non-modified power control step size, ➢ If the preferred form determined at step 20 is a non-modified form, at step 17 the power control step size for the MS is set to δ=δ$_1$, where δ$_1$ corresponds to a non-modified power control step size, ➢ at step 19 the thus determined power control step size δ$_1$ or δ$_2$ is combined with the "up" or "down" power control command provided at step 12 or 13, to obtain a resulting power control command for the MS.

This is periodically repeated, with a period T, as indicated by loop 14'.

Besides, for each modified form, parameters such as T' and δ$_2$ may be determined according to the various possibilities disclosed in the above-mentioned prior patent application, and recalled above.

To determine which form is preferred, among the various modified and non-modified forms which may be considered, various factors may in practice be used such as environment conditions, mobile speed, periodicity and/or length of transmission interruptions, . . . etc, or any other factor on which compensation requirements may depend. It will be understood that it is not possible to disclose here all examples and possibilities; the general idea for such a determination is that the thus determined preferred form is the one which enables to better compensate for the effects of transmission interruptions on power control, for each situation.

By allowing the preferred form to be a non-modified form, this enables to avoid the kind of above-mentioned problems. For example, if an adaptation of the algorithm has already been performed, in a favourable way, it may be needless, or even disadvantageous, to further modify this algorithm, further to a transmission interruption.

Besides, such an adaptation process could in itself be used to carry out such a compensation, without providing any further arrangement.

Besides, by allowing the preferred form to be determined among different possible modified forms, corresponding to various possible values of said at least one modified parameter and/or to various possible values of said given duration, this enables to still improve performances, by better adapting the type of compensation to each situation.

Besides this could also be obtained by taking another parameter of the algorithm than its power control step size, though this latter will probably be the most interesting one in practice.

Besides, the present invention also applies to any cases of transmission interruptions, whatever the reason of these interruptions ("slotted mode" or "compressed mode", "DTX" mode or "discontinuous transmission mode", . . . etc).

Part or all of steps 15 to 21 may be performed in the BTS, or in the MS, or part in the BTS and part in the MS. It may be advantageous that these steps be performed in the MS, to avoid an increase in the size of the corresponding power control messages to be sent to MSs. However, to avoid to send to the MS too many informations necessary to make such a determination of a preferred form, that part of step 20 which consists in such a determination may be performed in the BTS (the corresponding signalling informations being sent to the MS), and the other part of step 20, consisting in performing the required actions corresponding to this determination, in the MS; nevertheless the two possibilities will be considered in the following.

It should be noted that such signalling informations may be sent less frequently than the conventional "up" or "down" power control commands, which on the contrary require to be sent frequently enough for the algorithm to be efficient.

Such signalling informations may therefore be sent independently of such power control commands.

In particular, said signalling informations may be transmitted together with transmission interruption commands (containing such informations as transmission interruption periodicity, length. . . etc.). This is particularly advantageous in that it enables to achieve the improvement aimed at with the present invention in a both costless and efficient way.

Said signalling informations may include a bit indicating which of a non-modified and a modified form is preferred.

Said signalling informations may include additional bits indicating which of a plurality of modified forms is preferred.

According to a first embodiment, illustrated in FIG. 4, a mobile radiocommunication network entity 40 thus comprises, for performing said method in said uplink transmission direction (and further to other classical means not mentioned here):

means 41 for determining a preferred form in which said power control algorithm should preferably be implemented when transmission is resumed after a transmission interruption, to better compensate for the effects of said transmission interruption on power control, means 42 for sending corresponding signalling informations C1 to a mobile station 43.

As illustrated in FIG. 4, a mobile station 43 comprises, for performing said method in said uplink transmission direction (and further to other classical means not mentioned here):

means 44 for receiving such signalling informations C1 from a mobile radiocommunication network entity 40.

According to a second embodiment, illustrated in FIG. 5, a mobile station 43' thus comprises, for performing said method in said uplink transmission direction (and further to other classical means not mentioned here):

means 44' for determining a preferred form in which said power control algorithm should preferably be implemented when transmission is resumed after a transmission interruption, to better compensate for the effects of said transmission interruption on power control.

As already indicated, the present invention also applies to downlink power control.

According to a first embodiment, as illustrated in FIG. 6, a mobile station 45 comprises, for performing said method in said downlink transmission direction (and further to other classical means not mentioned here):

means 46 for determining a preferred form in which said power control algorithm should better be implemented when transmission is resumed after a transmission interruption, to better compensate for the effects of said transmission interruption on power control, means 47 for sending corresponding signalling informations C2 to a mobile radiocommunication network entity 48.

As illustrated in FIG. 6, a mobile radiocommunication network entity 48 comprises, for performing said method in said downlink transmission direction (and further to other classical means not mentioned here):

means 49 for receiving such signalling informations C2 from a mobile radiocommunication network entity 45.

According to a second embodiment, as illustrated in FIG. 7, a mobile radiocommunication network entity 48' comprises, for performing said method in said downlink transmission direction (and further to other classical means not mentioned here):

means 49' for determining a preferred form in which said power control algorithm should better be implemented when transmission is resumed after a transmission interruption, to better compensate for the effects of said transmission interruption on power control.

As already indicated, the present invention applies to uplink, or downlink, or both uplink and downlink, power control.

As already indicated, the present invention applies to any cases of transmission interruptions, whatever the reason of these interruptions ("slotted mode" or "compressed mode", "DTX" mode or "discontinuous transmission mode", . . . etc).

What is claimed is:

1. A method for improving performances of a mobile radiocommunication system using a power control algorithm, wherein said system may be subject to transmission interruptions, a method comprising the steps of:

determining a preferred form in which said power control algorithm should preferably be implemented when transmission is resumed after a transmission interruption, to better compensate for the effects of said transmission interruption on power control, implementing said power control algorithm in the thus determined form.

2. A method according to claim 1, wherein said preferred form is determined as the preferred one among:

at least one modified form, wherein at least one parameter of said power control algorithm is modified, for a given duration, when transmission is resumed, a non-modified form, wherein no parameter of said power control agorithm is modified when transmission is resumed.

3. A method according to claim 2, wherein said modified and non-modified forms include different forms in which said algorithm may be implemented to adapt it to various conditions requiring such an adaptation.

4. A method according to claim 3, wherein said conditions include environment conditions and/or mobile speed.

5. A method according to claim 2, wherein said at least one parameter is the power control step size of said power control algorithm.

6. A method according to claim 5, wherein said at least one modified parameter is an increased power control step size.

7. A method according to claim 1, wherein said mobile radiocommunication system is of CDMA type.

8. A method according to claim 1, wherein said power control is performed in the uplink transmission direction of said mobile radiocommunication system.

9. A method according to claim 1, wherein said power control is performed in the downlink transmission direction of said mobile radiocommunication system.

10. A method according to claim 1, wherein, said power control algorithm involving a transmitting entity and a receiving entity, said preferred form is determined in one of said entities, and sent, by means of signalling informations, to the other one of said entities, to be used by said other one of said entities.

11. A method according to claim 10, wherein said signalling informations are transmitted together with transmission interruption commands.

12. A method according to claim 10, wherein said signalling informations include a bit indicating which of a non-modified and a modified form is preferred.

13. A method according to claim 12, wherein said signalling informations include additional bits indicating which of a plurality of modified forms is preferred.

14. A method according to claim 1, wherein, said power control algorithm involving a transmitting entity and a receiving entity, said preferred form is determined by one of said entities, and used locally by this entity, without any signalling to the other entity.

15. A mobile radiocommunication network entity comprising, for performing a method according to claim 1 in said uplink transmission direction:

means for determining a preferred form in which said power control algorithm should better be implemented when transmission is resumed after a transmission interruption, to better compensate for the effects of said transmission interruption on power control, means for sending corresponding signalling informations to a mobile station.

16. A mobile station comprising, for performing a method according to claim 1 in said uplink transmission direction:

means for receiving signalling informations from a mobile radiocommunication network entity, corresponding to a preferred form in which said power control algorithm should better be implemented when transmission is resumed after a transmission interruption, to better compensate for the effects of said transmission interruption on power control.

17. A mobile station comprising, for performing a method according to claim 1 in said uplink transmission direction:

means for determining a preferred form in which said power control algorithm should better be implemented when transmission is resumed after a transmission interruption, to better compensate for the effects of said transmission interruption on power control.

18. A mobile station comprising, for performing a method according to claim 1 in said downlink transmission direction:

means for determining a preferred form in which said power control algorithm should better be implemented when transmission is resumed after a transmission interruption, to better compensate for the effects of said transmission interruption on power control, means for sending corresponding signalling informations to a mobile radiocommunication network entity.

19. A mobile radiocommunication network entity comprising, for performing a method according to claim 1 in said downlink transmission direction:

means for receiving signalling informations from a mobile station, corresponding to a preferred form in which said power control algorithm should better be implemented when transmission is resumed after a transmission interruption, to better compensate for the effects of said transmission interruption on power control.

20. A mobile radiocommunication network entity comprising, for performing a method according to claim 1 in said downlink transmission direction:
means for determining a preferred form in which said power control algorithm should better be implemented when transmission is resumed after a transmission interruption, to better compensate for the effects of said transmission interruption on power control.

21. The mobile radiocommunication system, comprising at least one mobile station according to any of claims 16, 17 of 18.

22. The mobile radiocommunication system, comprising at least one mobile radiocommunication network entity according to any one of claims 15, 19 of 20.

23. A method for improving performances of a mobile radiocommunication system using a power control algorithm, said method including a step of signaling a preferred form in which said power control algorithm should better be implemented, when transmission is resumed after a transmission interruption, to better compensate for the effects of said transmission interruption on power control, said preferred form being selected from:
a modified form, wherein a power control step size is modified, for a given duration, when transmission is resumed, and
a non-modified form, wherein a power control step size is not modified when transmission is resumed.

24. The method according to claim 23, wherein the thus signaled information is signaled together with transmission interruption commands.

25. The method according to claim 23, wherein the thus signaled information includes a bit indicating which of a non-modified and a modified form is preferred.

26. The method according to claim 23, wherein said modified power control step size is an increased power control step size.

27. The method according to claim 26, wherein said increased power control step size is equal to two times said non-modified power control step size.

28. The method according to claim 23, wherein said given duration is equal to the transmission interruption period.

29. A mobile station for a mobile radiocommunication system using a power control algorithm in an uplink transmission direction, said mobile station including means for receiving information signaling a preferred form in which said power control algorithm should better be implemented, when transmission is resumed after a transmission interruption, to better compensate for the effects of said transmission interruption on power control, said preferred form being selected from:
a modified form, wherein the power control step size is modified, for a given duration, when transmission is resumed, and
a non-modified form, wherein the power control step size is not modified when transmission is resumed.

30. The mobile station according to claim 29, wherein said information is signaled together with transmission interruption commands.

31. The mobile station according to claim 29, wherein said information includes a bit indicating which of a non-modified and a modified form is preferred.

32. The mobile station according to claim 29, wherein said modified power control step size is an increased power control step size.

33. The mobile station according to claim 32, wherein said increased power control step size is equal to two times said non-modified power control step size.

34. The mobile station according to claim 29, wherein said given duration is equal to the transmission interruption period.

35. The mobile radiocommunication system, including at least one mobile station according to claim 29.

36. A mobile radiocommunication network entity for a mobile radiocommunication system using a power control algorithm in an uplink transmission direction, said mobile radiocommunication network entity including means for transmitting information signaling a preferred form in which said power control algorithm should better be implemented, when transmission is resumed after a transmission interruption, to better compensate for the effects of said transmission interruption on power control, said preferred form being selected from:
a modified form, wherein the power control step size is modified, for a given duration, when transmission is resumed, and
a non-modified form, wherein the power control step size is not modified when transmission is resumed.

37. The mobile radiocommunication network entity according to claim 36, wherein said information is signaled together with transmission interruption commands.

38. The mobile radiocommunication network entity according to claim 36, wherein said information includes a bit indicating which of a non-modified and a modified form is preferred.

39. The mobile radiocommunication network entity according to claim 36, wherein said modified power control step size is an increased power control step size.

40. The mobile radiocommunication network entity according to claim 39, wherein said increased power control step size is equal to two times said non-modified power control step size.

41. The mobile radiocommunication network entity according to claim 36, wherein said given duration is equal to the transmission interruption period.

42. The mobile radiocommunication system, including at least one mobile radiocommunication network entity according to claim 36.

* * * * *